(12) United States Patent
Van De Broek

(10) Patent No.: US 9,194,150 B2
(45) Date of Patent: Nov. 24, 2015

(54) METHOD FOR CONSTRUCTING ENAMELLED STORAGE TANKS AND SILOS

(71) Applicant: Wout Bert Van De Broek, Hamont-Achel (BE)

(72) Inventor: Wout Bert Van De Broek, Hamont-Achel (BE)

(73) Assignee: POLYVISION, NAAMLOZE VENNOOTSCHAP, Genk (BE)

( * ) Notice: Subject to any disclaimer, the term of this patent is extended or adjusted under 35 U.S.C. 154(b) by 0 days.

(21) Appl. No.: 14/399,825

(22) PCT Filed: Jun. 19, 2013

(86) PCT No.: PCT/BE2013/000032
§ 371 (c)(1),
(2) Date: Nov. 7, 2014

(87) PCT Pub. No.: WO2014/008558
PCT Pub. Date: Jan. 16, 2014

(65) Prior Publication Data
US 2015/0107188 A1    Apr. 23, 2015

(30) Foreign Application Priority Data

Jun. 21, 2012   (BE) .................................. 2012/0424

(51) Int. Cl.
*E04B 1/12* (2006.01)
*E04H 7/30* (2006.01)
*E04H 7/06* (2006.01)
*B05D 3/02* (2006.01)
*E04H 7/22* (2006.01)
*B32B 15/01* (2006.01)
*C23D 5/00* (2006.01)

(52) U.S. Cl.
CPC ................ *E04H 7/30* (2013.01); *B05D 3/0254* (2013.01); *B32B 15/011* (2013.01); *E04H 7/06* (2013.01); *E04H 7/22* (2013.01); *C23D 5/00* (2013.01)

(58) Field of Classification Search
CPC ............... E04H 7/06; E04H 7/22; E04H 7/30; B05D 3/0254; B32B 15/011; C23D 5/00
USPC ........................ 52/741.4, 192, 197
See application file for complete search history.

(56) References Cited

FOREIGN PATENT DOCUMENTS

DE    20 2011 004545 U1    6/2011

OTHER PUBLICATIONS

International Search Report, dated Oct. 29, 2013, from corresponding PCT application.

*Primary Examiner* — Jeanette E Chapman
*Assistant Examiner* — James Buckle, Jr.
(74) *Attorney, Agent, or Firm* — Young & Thompson

(57) ABSTRACT

Method for constructing enamelled storage tanks and silos, whereby the storage tank is constructed from segments of non-enamelled thick-walled steel that are fastened together on the construction site by welding, and then clad with a double-sided enamelled flexible thin-walled steel plate on the inside and outside of the storage tank, and whereby the enamelling temperature is at least 500° C.

4 Claims, 4 Drawing Sheets

METHOD FOR CONSTRUCTING ENAMELLED STORAGE TANKS AND SILOS

BACKGROUND OF THE INVENTION

1. Field of the Invention

The present invention relates to a method for constructing and cladding storage tanks and silos.

More specifically the invention is intended for cladding storage tanks and silos with enamelled steel, and this on the inside and outside.

2. Description of the Related Art

Such storage tanks are useful in industrial applications such as in the food industry, agriculture, mining, chemicals and petrochemicals, biological fuels, waste processing, water purification, desalination and similar.

It is known that enamelled steel can be used for the construction of storage tanks, whereby both the inside and outside of the tank present an enamelled surface. The enamelled steel on the outside of the tank does not need to be painted, and on the inside of a tank it provides an inert surface resistant to almost all conceivable materials that are stored therein.

Traditionally such storage tanks are constructed from pre-fabricated enamelled curved thick-walled steel segments that are fastened together in situ either by screwing them together with bolts, or by welding them together, either on site or in a construction facility.

Traditionally the method by which two double-sided enamelled curved thick-walled steel segments are riveted together is by a double row of bolts with nuts that all go through the two segments to be fastened together and hold them together.

A disadvantage of this conventional method is that all segments consist of pre-enamelled thick-walled steel, which makes these segments more expensive than non-enamelled metal segments.

Another disadvantage of this conventional method is that an unevenness or seam is created on the inside and outside of the storage tank, at the level of the joint of a pair of segments, which detrimentally affects the smoothness of the inside cladding and exposes the edge of the enamelled steel to the materials stored in the tank.

For segments that are fastened together with bolts, the section that is screwed together presents a potentially weaker resistance to the pressure and weight of the stored materials, which limits the height and diameter of the storage tank.

Another disadvantage of this conventional method to construct enamelled storage tanks is that the segments must be enamelled beforehand and frequently on both sides, which is an expensive batch process on account of the dimensions and weight of these segments.

Furthermore the use of enamelled hot-rolled thick steel is less suitable than enamelled cold-rolled thin steel with regard to open pores and fish scales, which is important for the quality of both the internal and external cladding of silos and tanks.

SUMMARY OF THE INVENTION

The purpose of the present invention is to provide a solution to the aforementioned and other disadvantages, by providing a method that enables enamelled storage tanks and silos to be constructed, whereby the storage tank is constructed from segments of non-enamelled thick-walled steel, which are fastened together on the construction site by welding, and then clad with a double-sided enamelled flexible thin-walled steel plate on the inside and outside of the storage tank.

An advantage of such a method is that it enables the storage tank to be erected in cheap non-enamelled thick-walled steel, and this thick-walled steel to be clad in situ with double-sided enamelled thin-walled flexible steel that can be fastened to the non-enamelled thick-walled steel by gluing, whereby the known advantages of an enamelled surface such as durability and inertness are obtained in a storage tank, but at a much lower cost.

The lower cost is partly the result of the cheaper production process according to the invention for enamelling thin-walled steel on a roll. This production process enables strips of thin-walled steel of approx. 150 m long to be enamelled whereby a continuous surface of enamel is obtained.

According to the current state of the art, segments of thick steel are first enamelled on both sides in a batch process, whereby each heavy segment is suspended in a furnace by means of eyes in the steel, and the enamel surface is interrupted by these suspension points.

According to the current state of the art, the more expensive pre-enamelled segments of thick steel still have to be transported to the construction site and are fastened together there.

An advantage of the method according to the invention is that cheap untreated steel in the form of segments can be assembled in situ, and after a surface treatment are suitable for the bonding of the double-sided enamelled thin steel strips that provide the same surface properties for the storage tank as those according to the current state of the art.

Preferably the segments of thick-walled non-enamelled steel are fastened together by welding.

An advantage of such segments welded together is that they do not overlap one another and can be ground smooth by sandblasting, after which they are suitable for a sheet of thin double-sided enamelled steel to be glued onto them, whereby a smooth surface can be obtained on the inside and the outside.

A two-component polyurethane-based adhesive can be used for the gluing or another suitable adhesive.

Preferably the thin double-sided enamelled flexible steel plate is affixed in horizontal, vertical or long helical strips that can be joined to one another by means of a horizontal, vertical or long helical strip of enamelled thin steel that is bonded over the strip edges joined to one another, or by sealing the joint between two strips with a silicone-based sealant suitable for the intended application and available on the market, and which can be applied using an injection system.

An additional advantage of the method according to the invention is that larger dimensions for silos and tanks are possible.

The invention also concerns a production process for flexible double-sided enamelled thin-walled steel that consists of unrolling a roll of thin-walled steel, and after being coated with enamel on both sides it is guided through an enamel furnace by means of pinch rollers that are outside the enamel furnace and which continuously convey the thin-walled steel band through the furnace, whereby the enamel can be fired at a high temperature (>500° C.) without damaging the surface of the enamel coating.

An advantage of this continuous technique for enamelling thin steel is that strips up to approx. 150 m long can be enamelled in a single passage through the process, which enables low-cost production.

Another advantage attached to this continuous enamelling technique is that the enamelled steel remains flexible enough to the able to be used in a curved form, such as in a helical strip on the inside or outside of a storage tank.

BRIEF DESCRIPTION OF THE DRAWING FIGURES

With the intention of better showing the characteristics of the invention, a few preferred embodiments of a method for constructing and cladding tanks and silos according to the invention, and a production process according to the invention, are described hereinafter by way of an example, without any limiting nature, with reference to the accompanying drawings, wherein:

FIG. 1 schematically shows a cross-section of a screwed overlap between two double-sided enamelled segments of thick steel according to the state of the art;

Figure 5:
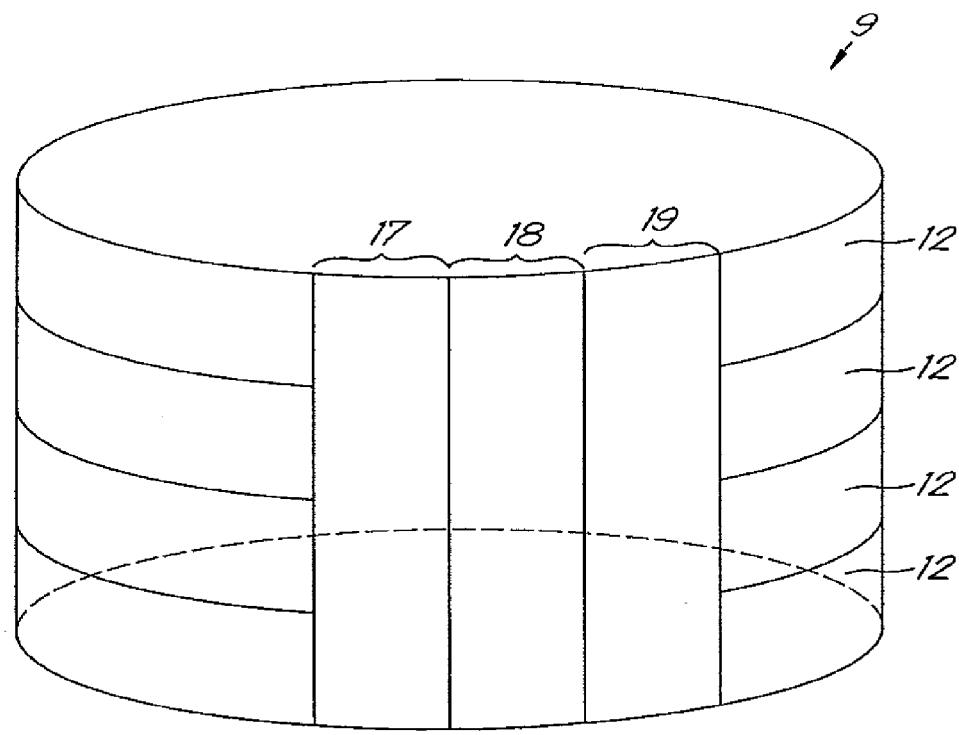
Figure 6:
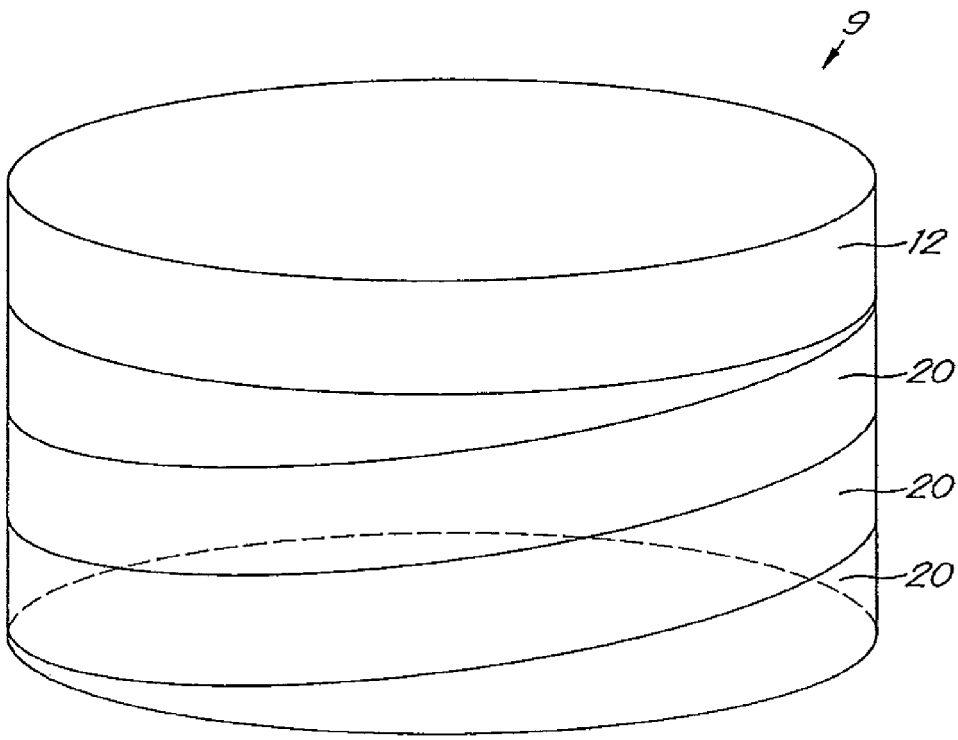
Figure 7:
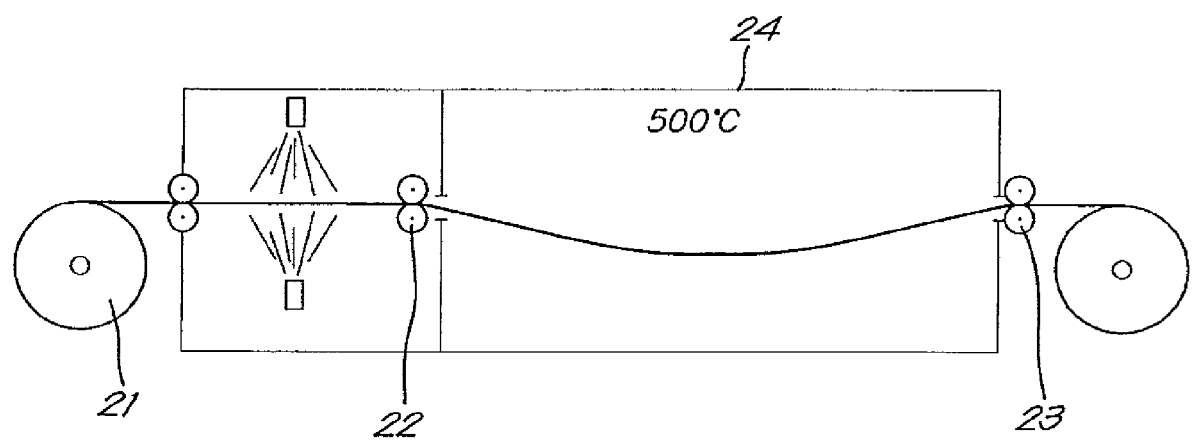

FIG. 5 schematically shows a perspective view of a storage tank constructed from rings of thick steel, clad on the outside with vertical strips of thin flexible double-sided enamelled steel according to the invention;

FIG. 6 shows FIG. 5, but now clad with a helical strip of thin flexible double-sided enamelled steel according to the invention;

FIG. 7 shows a continuous enamelling process for the double-sided enamelling of thin steel according to the invention.

DETAILED DESCRIPTION OF THE INVENTION

Figure 1:
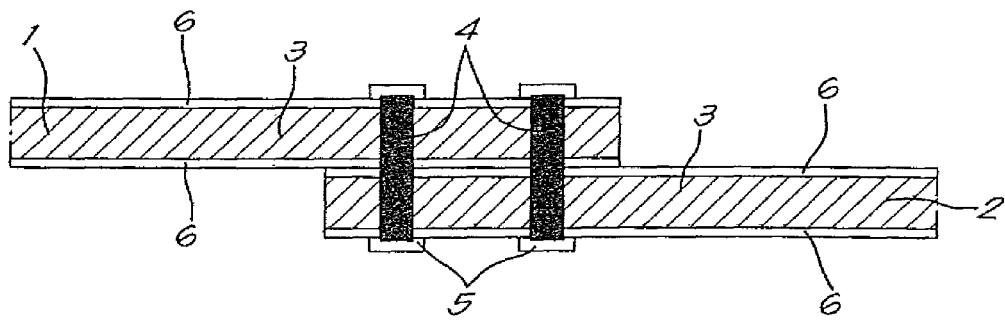

FIG. 1 presents the cross-section between two overlapping parts of two double-sided enamelled segments 1, 2 of thick steel 3 that are held together by means of two screws 4 with bolts 5 and whereby both segments have an enamel coating 6 on either side, as now applied in the state of the art.

Figure 2:
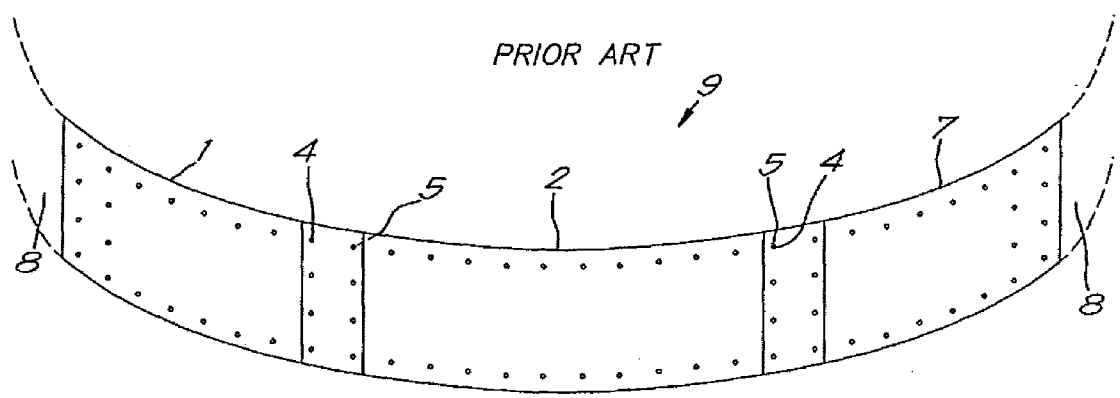
FIG. 2 shows three segments of a circular storage tank screwed together according to the state of the art.

FIG. 2 shows three curved segments 1, 2, 7 that are screwed together with screws 4 and bolts 5 and form part of a ring 8 that forms a part of a storage tank 9, as is known in the state of the art.

Figure 3:
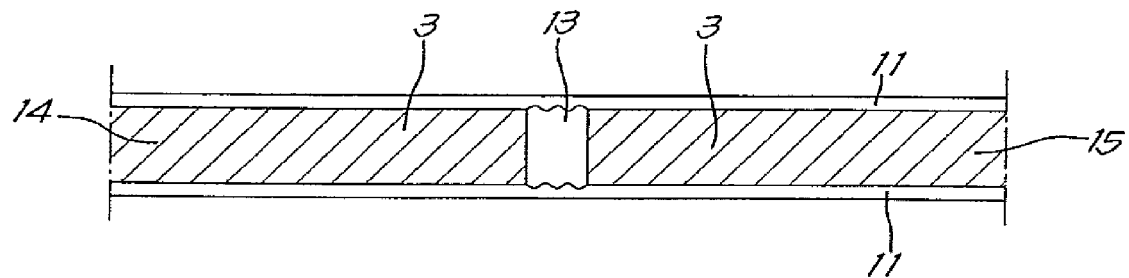
FIG. 3 shows a cross-section of two segments of thick steel welded together, and the cladding of the two segments on the inside and outside with a thin flexible double-sided enamelled steel plate according to the invention.

FIG. 3 shows a cross-section of two non-enamelled segments 14, 15 of thick steel 3 welded together by means of a welded joint 13, that are clad on the inside and outside with double-sided enamelled flexible thin steel 11 that is glued onto the thick steel 3.

Figure 4:
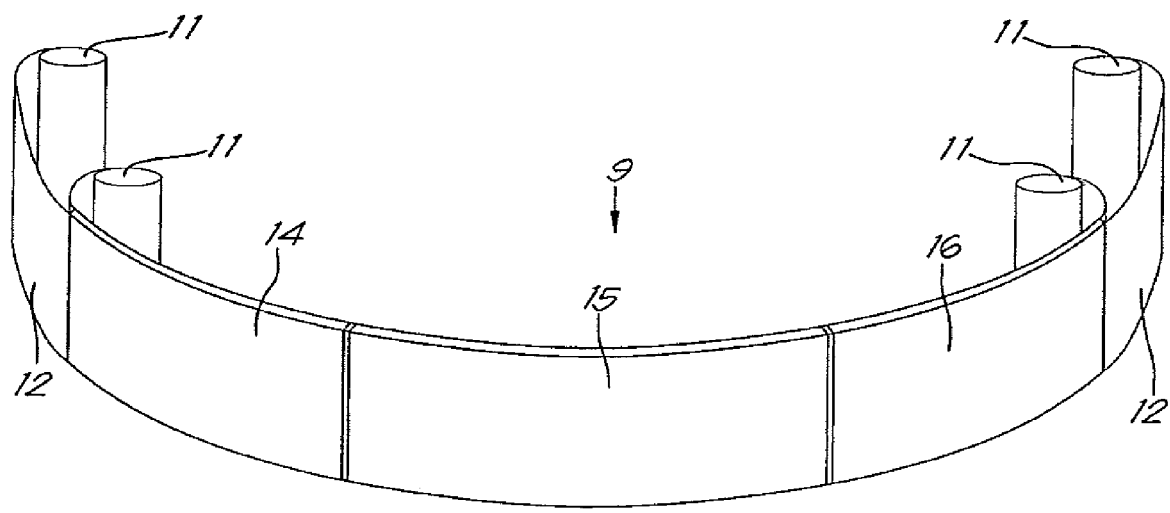
FIG. 4 shows a perspective view of a part of a ring of a storage tank consisting of curved segments welded together, clad with a thin flexible double-sided enamelled steel plate according to the invention on the inside and outside.

FIG. 4 shows a part of a circular segment 12 of a storage tank consisting of welded segments 14, 15, 16 of thick steel 3 that are not enamelled, whereby the inside and outside of the storage tank are clad with double-sided enamelled flexible thin steel 11 that is glued to the thick steel.

FIG. 5 shows a storage tank 9, constructed from circular segments 12 of non-enamelled thick steel 3, that is clad with vertical strips 17, 18, 19 of double-sided enamelled thin steel 11, whereby the joint between two vertical strips 18, 19 is covered with a narrow strip of the double-sided enamelled thin steel 11 that is glued over the joint or whereby the joint is sealed with a silicone-based sealant suitable for the application and available on the market, and which can be applied using an injection system. This cladding with vertical strips 17, 18, 19 of enamelled thin steel 11 is on the inside and outside of the storage tank 9.

FIG. 6 shows a storage tank 9, constructed from circular segments 12 of non-enamelled thick steel 3, that is clad with a helical strip 20 of double-sided enamelled thin steel 11, whereby the long helical strip 20 of thin flexible double-sided enamelled steel 11 partly overlaps with the lower part of the long strip 20, whereby the overlapping part is glued to the lower part of the strip, thereby sealing the joint between successive windings of the thin enamelled steel plate 11 occurring between two horizontal strips. This cladding with a helical strip 20 of enamelled steel is on the inside and outside of the storage tank.

FIG. 7 shows a continuous enamelling process for double-sided enamelled thin flexible steel 11, that is rolled out from a roll 21 and conveyed through two sets of two pinch rollers 22,23, which are in front of the entrance and after the exit of the enamel furnace 24, and whereby after applying an enamel coat on either side, the steel is enamelled on both sides at a temperature above 500° C., while the steel hangs freely in the furnace and there are no flaws on the enamel surfaces on either side due to contact with supporting elements.

An advantage of this continuous enamelling process is that the continuous passage of a thin metal band is flexible and bends somewhat under the effect of the high temperature in the furnace, but the band remains intact and undamaged so that a flawless enamel coating is obtained on both surfaces of the thin steel.

The method for constructing enamelled storage tanks 9 is very simple and as follows. The storage tank 9 is constructed by assembling circular segments of the tank of curved segments of non-enamelled thick steel that are welded together, after which these circular segments are stacked on one another and welded together to form a storage tank.

The non-enamelled thick steel is then clad with a layer of thin double-sided enamelled steel that is glued in strips to the non-enamelled steel.

These strips can be vertical strips, horizontal strips or long helical strips that fastened on a slight slope to the inside and outside surface of the tank attached by means of a suitable adhesive, such as a two-component polyurethane adhesive for example.

Then the joints between adjacent strips of double-sided enamelled thin steel are sealed by affixing a thin strip of double-sided enamelled steel over the joints by gluing, or by sealing the joints with a silicone-based sealant suitable for the application and available on the market, and which can be applied using an injection system.

It goes without saying that variants of this method can also be used. The present invention is by no means limited to the embodiments described as an example and shown in the drawings, but such a method according to the invention for obtaining enamelled storage tanks can be realised in all kinds of variants, without departing from the scope of the invention.

The invention claimed is:
1. A production process for flexible thin double-sided enameled steel, comprising:
  unrolling a roll of thin-walled steel;
  coating the thin walled steel with enamel on both sides; and
  guiding the thin walled steel through an enamel furnace by
    means of pinch rollers that are outside of the enamel
    furnace and which continuously convey the thin-walled
    steel, which is a hanging steel band, through the enamel
    furnace, whereby the enamel is fired at a high temperature greater than 500° C. on both sides without damaging the surface of the enamel coating.

2. A method for constructing enameled storage tanks or silos, comprising:
constructing the storage tank or silo from segments of non-enameled thick-walled steel that are fastened together on a construction site by means of welding;
grinding smooth and sandblasting the segments of non-enameled thick-walled steel; and
cladding with a double-sided enameled flexible thin-walled steel plate on an inside and an outside of the storage tank or silo, and an enameling temperature is at least 500° C.,
wherein the thin double-sided flexible enameled steel plates are glued with a suitable adhesive that presents sufficient adhesion, or with a two-components adhesive based on polyurethane, onto the segments of non-enameled steel fastened together.

3. A method for constructing enameled storage tanks or silos, comprising:
constructing the storage tank or silo from segments of non-enameled thick-walled steel that are fastened together on a construction site by means of welding; and
cladding with a double-sided enameled flexible thin-walled steel plate on an inside and an outside of the storage tank or silo, and an enameling temperature is at least 500° C.,
wherein the thin double-sided flexible enamelled steel plates are affixed in horizontal, vertical or long helical strips, and
the horizontal, vertical or long helical strips are joined to one another by means of a horizontal, vertical or long helical thin strip of enamelled thin steel that is bonded over the two strips to be joined together or by sealing the joints between the vertical, horizontal or helical strips with a silicone-based sealant, and which can be applied using an injection system.

4. The method according to claim 3, wherein the long helical strip of thin flexible double-sided enameled steel partly overlaps the lower part of the long strip, the overlapping part is glued to a lower part of the strip, thereby sealing a joint that arises between successive windings of the thin steel plate.

* * * * *